US007360238B2

(12) United States Patent
Owlett

(10) Patent No.: US 7,360,238 B2
(45) Date of Patent: Apr. 15, 2008

(54) METHOD AND SYSTEM FOR AUTHENTICATION OF A USER

(75) Inventor: John Owlett, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1257 days.

(21) Appl. No.: 10/081,500

(22) Filed: Feb. 22, 2002

(65) Prior Publication Data

US 2003/0093671 A1   May 15, 2003

(30) Foreign Application Priority Data

Nov. 13, 2001   (GB)   ................................. 0127205.3

(51) Int. Cl.
*H04L 9/32* (2006.01)
*H04L 9/28* (2006.01)
*G06F 7/04* (2006.01)

(52) U.S. Cl. ......................................... 726/2; 713/168

(58) Field of Classification Search ................ 380/270; 713/168; 726/2
See application file for complete search history.

(56) References Cited

U.S. PATENT DOCUMENTS

| 6,072,875 A * | 6/2000 | Tsudik ........................ 380/270 |
| 2002/0034301 A1* | 3/2002 | Andersson .................. 380/270 |
| 2004/0202328 A1* | 10/2004 | Hara .......................... 380/270 |

OTHER PUBLICATIONS

B. Kaliski. PKCS #1: RSA Encryption Version 1.5. Mar. 1998. RSA Laboratories East. p. 1-18.*

* cited by examiner

*Primary Examiner*—Christian LaForgia
(74) *Attorney, Agent, or Firm*—Myers Bigel Sibley & Sajovec

(57) ABSTRACT

A method and system for authentication of a user (302, 402) by an authenticating entity (304, 404). The method including the authenticating entity (304, 404) sending a challenge (310, 410) to the user (302, 402). The user (302, 402) adds a spoiler to the challenge (312, 412) and encrypts (316, 416) the combined spoiler and challenge (314, 414) using a private key of an asymmetric key pair. The user (302, 402) sends the encrypted combined spoiler and challenge to the authenticating entity (304, 404). The authenticating entity (304, 404) ascertains that the returned challenge is the same the original challenge (310, 410) and approves the user (302, 402).

11 Claims, 4 Drawing Sheets

METHOD AND SYSTEM FOR AUTHENTICATION OF A USER

FIELD OF THE INVENTION

The invention relates to a method and system for authentication of a user. In particular, in the invention relates to authentication of a user in the field of public key cryptography.

BACKGROUND OF THE INVENTION

Public key cryptosystems use a pair of asymmetric related keys, one for encryption and the other for decryption. Encryption in this context does not necessarily imply that the result is confidential, since data encrypted with a private key can be decrypted by anyone holding the public key—which may be widely available. One of the key pair, the private key, is kept secret by the user, while the other key, the public key, can be publicly disclosed. The key pair must have the property that, given knowledge of the public key, it is infeasible to determine the private key.

A user receives or, with suitable hardware or software, can generate for itself a pair of keys which are generally two large numbers. The user keeps one of these keys private and never discloses it. The other can be safely made public, just like a phone number or similar personal data. Due to the way the keys are generated, information encrypted with the private key can only be decrypted with the public key and vice versa. Using a key pair means that the sender and receiver do not need to share a secret key.

Public keys do not have to be published to the world. They can be shared as widely or narrowly as business and privacy requirements dictate.

The term "user" is defined as any entity including individuals, groups of individuals, one or more individuals in a role, corporations, organisations, computer applications or systems, automated machines, etc.

Public key cryptography makes the following possible:

Anyone knowing the user's public key can send the user a message encrypted with that key and can be sure that only the user—who alone has the corresponding private key—can decrypt it. This provides confidentiality.

The user might also encrypt a message with his private key. This cannot provide confidentiality, because anyone who knows the corresponding public key can decrypt it. But the fact that they can decrypt it means the message must have come from the user—who alone has the private key. This provides authentication and can also be used as a basis for non-repudiation—the digital equivalent of a signature.

If a sender signs a message with his own private key and then encrypts it with the recipient's public key, confidentiality, authentication and non-repudiation are provided together.

In practice, things are actually more complex. In the first situation, for performance and operational reasons, the sender will choose a random symmetric session key and a symmetric cipher to encrypt the message. The public key will be used to encrypt just the session key.

In the second situation above, a message is signed with a private key and this is known as a digital signature. One problem with signature methods is that cryptography can be slow due to the processing and communications overheads required. The volume of data sent is at least double the size of the original message.

Confidentiality may not be required and it may be desirable to be able to send signed plaintext messages. A method can be used that does not require the entire message to be encrypted and therefore reduces processing and communication overheads. This method is based on obtaining a "digest" of the message the user wishes to sign. One form of obtaining a message digest is a hash function. A hash function is a one-way function which maps an arbitrarily long piece of plain text into a comparatively small fixed-length bit string which is the message digest.

The hash function has the property that if the message is changed in anyway an entirely different value of message digest is produced by the hash function. It should also not be possible to generate two messages that have the same message digest. Given P (plaintext) it should be easy to compute H(P) (hash of the plaintext). Given H(P) it should be effectively impossible to find P (the original plaintext).

In the second situation, the hash function is used to generate a message digest from the content of the message to be signed. The message digest is then encrypted using the private key of a key pair to obtain the signature. The original plaintext message is transmitted together with the signature.

A recipient of the message uses the same hash function to obtain a digest of the plaintext message that has been received. The recipient also decrypts the signature using the public key of the key pair and obtains the message digest which was sent by the originator. The recipient compares the two digests and if they are the same, the signature is verified and the recipient is assured of the integrity and authenticity of the message.

FIG. 1 illustrates this prior art method of signing using a public key cryptography system. An originator 102 wishes to send a message 106 to a recipient 104. The originator 102 uses a hash function 108 to obtain a digest 110 of the message 106. The digest 110 is then encrypted 112 using the originator's 102 private key to obtain a signature 114. The originator 102 sends the message 106 and the signature 114 to the recipient 104.

The recipient 104 applies the same hash function 108 to the message 106 it has received to obtain a digest 118. The recipient also decrypts 120 the signature 114 it has received using the originator's public key. The decrypted signature is the digest 110 made by the originator 102. The digest 110 obtained by decrypting the signature is compared 124 to the digest 118 made by the recipient. If the two digests are the same, the message 106 has been verified by the signature.

As a separate process, authentication of a user can be carried out by a "challenge-response" procedure. The challenge-response procedure may be provided as an authentication protocol in the surrounding communications protocol such as the network-layer protocol or application-layer protocol. The user to be authenticated sends a message to the system that makes the authentication indicating that it wishes to open communication. The system sends a random value called a challenge to the user. The random value is different for each authentication request. The user encrypts the random value using its private key and sends the encrypted version back to the system. The system decrypts the version using the public key corresponding to the private key and verifies that the user is who it says it is. Communication can then commence between the user and the system.

The known challenge-response procedure is illustrated in FIG. 2. A user, Alice, 202 wishes have access to Bob 204 and Bob 204 wishes to authenticate that the user Alice 202 is not an impostor before granting access. Alice 202 sends a request 206 to Bob 204 to log on. Bob responds by creating 208 a challenge 210 and sending the challenge 210 to Alice 202 asking her to encrypt 212 the challenge 210.

Alice 202 encrypts 214 the challenge 210 with her private key and sends the signed challenge 216 to Bob 204. Bob 204 decrypts 218 the signed challenge 216 with Alice's public key. If the decrypted challenge is the same as the original challenge 210, Bob 204 approves access 220 to Alice 202.

Bob 204 may apply a hash function to the challenge 210 to obtain a digest and may send the digest to Alice 202 to encrypt with her signature.

If a user uses a single private key for both signing messages and challenge-response authentication, there is a risk that a challenge may be used to obtain a forged signature. If the challenge that is sent is not a random value but is a message digest obtained, for example, by applying a hash function to a message, the user wishing to be authenticated will apply his signature to the message digest and send the signed digest back to the authenticating system. For example, what is thought to be a random sequence could be a cheque sequence and signing the sequence would be signing the cheque, or a digest of the cheque.

In this way, a user may encrypt what it thinks is a random challenge but is actually the digest of a message of value, thus inadvertently signing the message. There is also a danger that a user can deny signing a message by claiming that the signature had been obtained by this forgery method.

The conventional solution to the above problem is to use two separate key pairs for each of signature and authentication. This has the disadvantage of extra maintenance of the keys including administrative tasks to manage two different key pairs and their associated certificates. This is particularly a problem if hardware tokens such as smart cards are used which have limited storage capabilities.

It is an aim of the present invention to enable the use of a single key pair for both signature and authentication by providing a safeguard against forgery of signed messages obtained during authentication.

SUMMARY OF THE INVENTION

According to a first aspect of the present invention there is provided a method for authentication of a user by an authenticating entity comprising the steps of: the authenticating entity sending a challenge to the user; the user adding a spoiler to the challenge; the user encrypting the combined spoiler and the challenge using a private key of an asymmetric key pair; the user sending a response to the authenticating entity in the form of the encrypted combined spoiler and challenge.

Preferably, the method includes the authenticating entity decrypting the encrypted combined spoiler and challenge using the public key of the asymmetric key pair and determining if the user has been authenticated.

The addition of a spoiler to the challenge may be carried out by applying a spoiler function to the challenge. The form of the spoiler function may be sent to the authenticating entity.

The spoiler may be added to the challenge as a prefix or a suffix and the authenticating entity extracts the challenge by counting the number of bytes from the beginning or end of the combined spoiler and challenge.

The method may include the user obtaining a digest of the combined spoiler and challenge before the step of encrypting. The user may obtain the digest by applying a hash function to the combined spoiler and challenge. The user may send details of the spoiler and the method of obtaining the digest to the authenticating entity. The authenticating entity may obtain a digest of the combined spoiler and the original challenge that the authenticating entity sent to the user and may compare the digest to a digest obtained by decrypting the response from the user.

The user may also send details of the algorithm used for encryption to the authenticating entity, if this has not already been agreed between the user and the authenticating entity.

The challenge may be a bit sequence. The spoiler may be an additional bit sequence.

According to a second aspect of the present invention there is provided a system for authentication of a user comprising a first application and an authenticating second application, the authenticating second application having means for sending a challenge to the first application, the first application having means for adding a spoiler to the challenge and means for encrypting the combined spoiler and the challenge with a private key of an asymmetric key pair, and means for sending the encrypted combined spoiler and challenge from the first application to the authenticating second application.

According to a third aspect of the present invention there is provided a computer program product stored on a computer readable storage medium for authentication of a user by an authenticating entity, comprising computer readable program code means for performing the steps of: the authenticating entity sending a challenge to the user; the user adding a spoiler to the challenge; the user encrypting the combined spoiler and the challenge using a private key of an asymmetric key pair; the user sending a response to the authenticating entity in the form of the encrypted combined spoiler and challenge.

BRIEF DESCRIPTION OF THE DRAWINGS

A preferred embodiment of the invention will now be described in detail by way of example only with reference to the following drawings.

DETAILED DESCRIPTION

A method of authentication is described in which the same public key cryptography key pair can safely be used for authentication as well as being used for signing messages without the risk of a forged signature being obtained during the authentication process.

Figure 1:
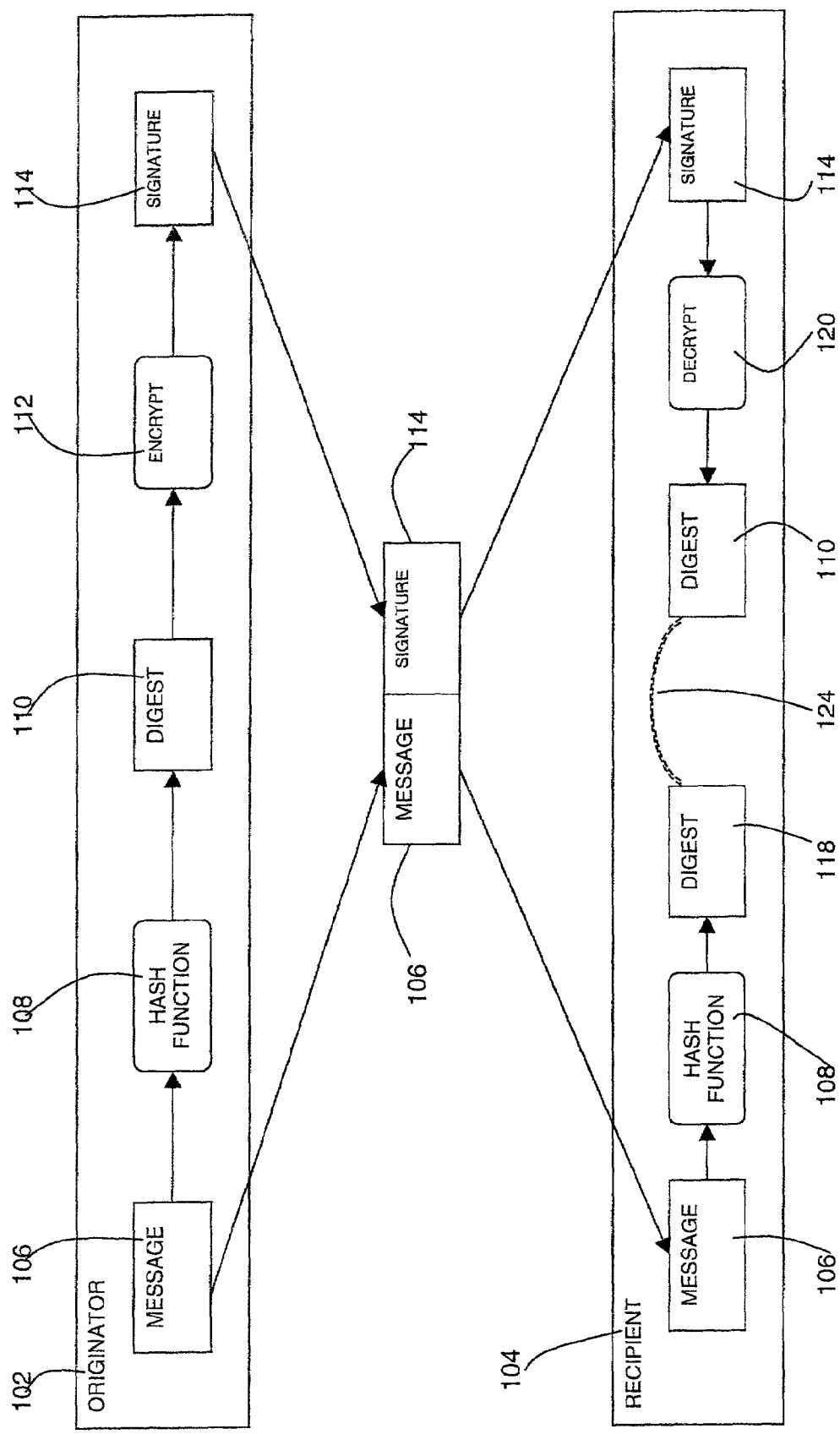
FIG. 1 is a diagram of a conventional signing procedure as known in the prior art.
Figure 2:
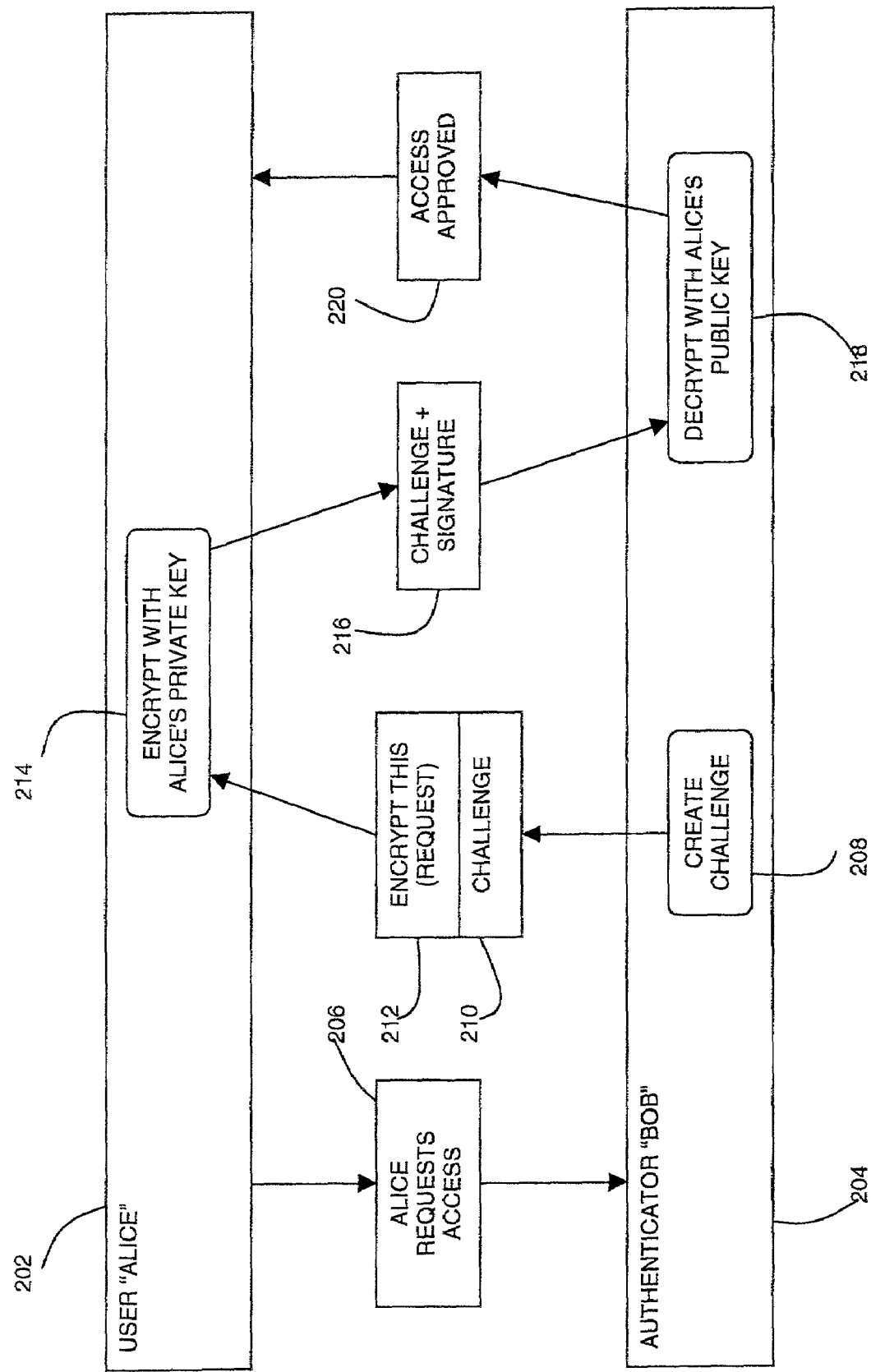
FIG. 2 is a diagram of a conventional authentication procedure as known in the prior art.
Figure 3:
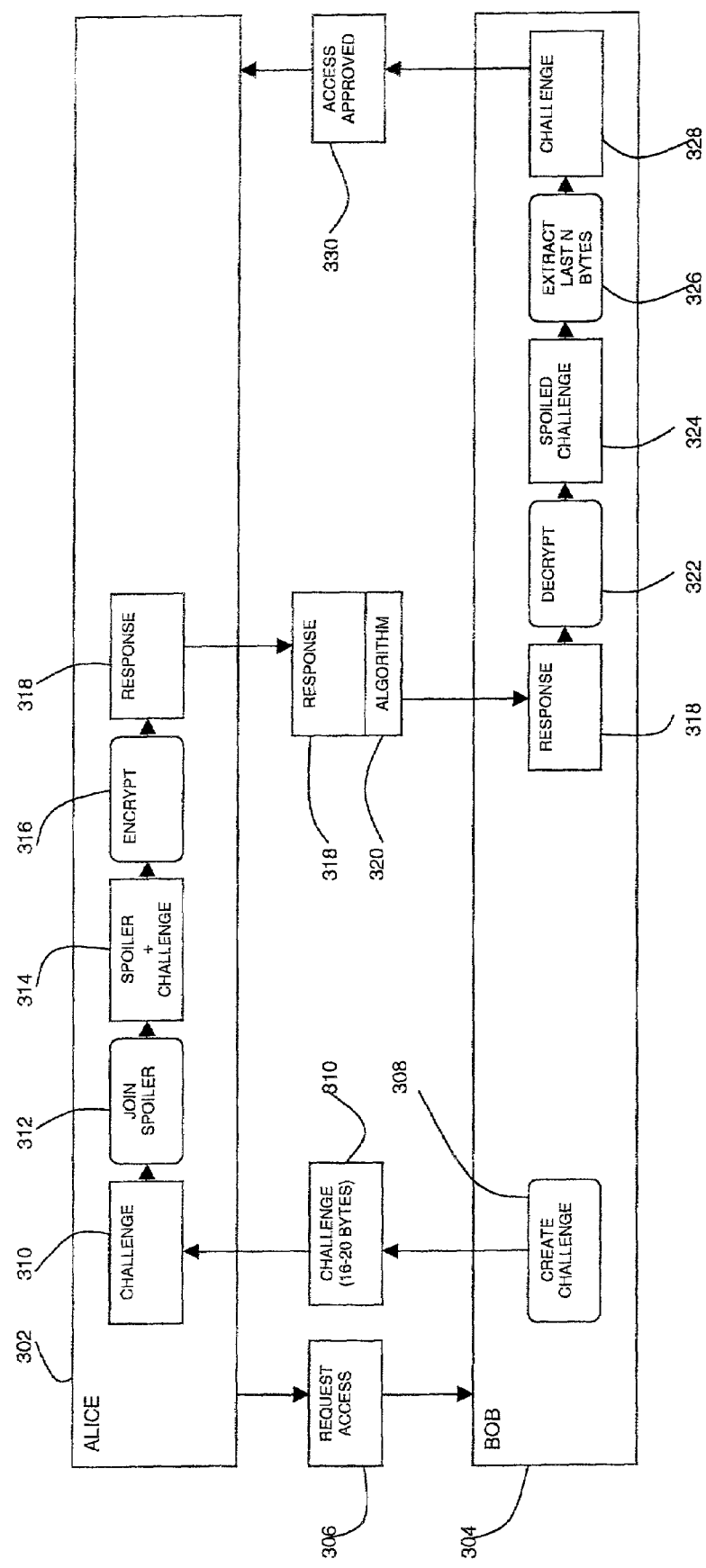
FIG. 3 is a diagram of an authentication method in accordance with an embodiment of the present invention.

A first embodiment of the authentication method is shown in FIG. 3. A user, Alice, 302 wishes to access a system run by Bob 304. Bob 304 wishes to authenticate Alice 302 to make sure that it is Alice 302 that he is granting access to.

Alice 302 sends a request 306 to Bob 304 for access. Bob 304 creates 308 a challenge 310, which may be a random sequence of 16 to 20 bytes in length. Bob 304 sends the challenge 310 to Alice 302 asking her to encrypt the challenge 310.

Alice 302 receives the challenge 310 and joins 312 the challenge 310 to a spoiler which she has created resulting in a combined spoiler and challenge 314. The combined spoiler and challenge 314 are encrypted 316 by Alice 302 using her private key of a public key cryptography key pair which is registered for Alice 302. The encryption 316 results in a response 318. The response 318 is sent by Alice 302 to Bob 304 together with details of the encryption algorithm used 320, if this has not already been agreed between Alice 302 and Bob 304.

Bob 304 receives the response 318 and decrypts 322 the response 318 using the algorithm 320 notified by Alice 302 and using Alice's public key. If Bob 304 does not already have Alice's public key, he can obtain this in the conventional manner from a certification authority together with a certificate confirming Alice's identity.

The decryption 322 results in Bob 304 obtaining the spoiled challenge 324 in the form of the combination of the spoiler and the original challenge created by Bob 304. Bob 304 knows how many bytes the original challenge 310 was and extracts 326 the number of bytes of the challenge 310 from the spoiled challenge 324. For example, if the original challenge was 16 bytes in length and the spoiler was added as a prefix to the challenge, the challenge can be extracted by taking the last 16 bytes of the spoiled challenge.

If the challenge 328 obtained by Bob 304 is the same as the original challenge 310, the access is approved 330.

Figure 4:
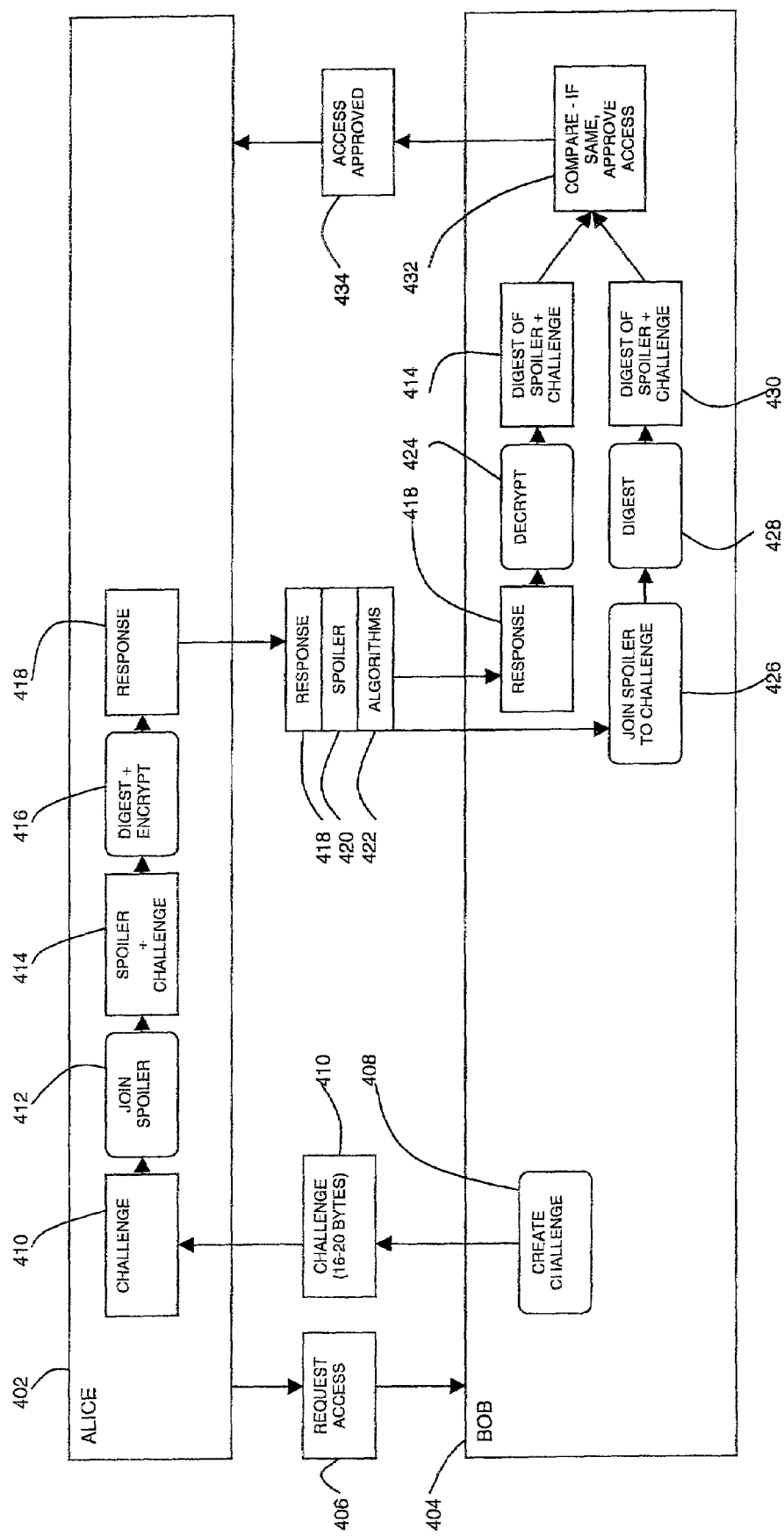
FIG. 4 is a diagram of an authentication method in accordance with an embodiment of the present invention.

A second embodiment of the authentication method is shown in FIG. 4. Alice 402 sends a request for access 406 to Bob 404 as in the first embodiment. Bob 404 creates a challenge 410 and sends the challenge 410 to Alice 402 asking her to encrypt the challenge 410.

Alice 402 receives the challenge 410 and joins 412 a spoiler which she has created to the challenge 410 resulting in a combined spoiler and challenge 414. Alice 402 applies a hash function to the combined spoiler and challenge 414 to obtain a digest and encrypts 416 the digest with her private key. The result is a response 418 in the form of a signed digest of the spoiler and challenge.

Alice 402 sends the response 418 to Bob 404 together with notifications of what the spoiler is 420 and the hash function and encryption algorithms used 422, if these have not already been agreed between Alice 402 and Bob 404. Bob 404 receives the response 418 and decrypts 424 the response 418 using the algorithm notified 422 by Alice 402 and using Alice's public key. Bob 404 obtains the digest 414 of the combined spoiler and the challenge 414. As the hash function is not reversible, Bob 404 cannot obtain the spoiler and the challenge from the digest 414.

Bob 404 also joins 426 the spoiler which was notified 420 by Alice 402 to the original challenge 410 which Bob 404 created. Bob 404 applies the hash function 428 that was notified 422 by Alice 402 to the combined spoiler and original challenge and obtains a digest 430.

Bob 404 compares 432 the digest 414 obtained from the decryption 424 using Alice's public key with the digest 430 Bob 404 has obtained by using the hash function 428. If the two digests 414, 430 are the same, Alice 402 has been successfully authenticated by the challenge and access is approved 434. If the digests 414, 430 are not the same, access is denied to Alice 402 as the challenge has not been successfully carried out.

The second embodiment can be summarised by the following steps:
1. Bob sends Alice a random challenge X;
2. Alice prefixes the random challenge with her spoiling message Y, yielding Y,X;
3. Alice digests the result with a cryptographic hash function H to yield a short digest H(Y,X);
4. Alice encrypts the result with her private key S, yielding Enc(S,H(Y,X));
5. Alice sends to Bob:
   Enc(S,H(Y,X))
   Y—her own spoiling message
   Details of which Enc and H algorithms she has used.
6. Once received, Bob decrypts Enc(S,H(Y,X)) using Alice's public key P to get what should be, if all is well, H(Y,X). He can do no more with this as H is not reversible.
7. Bob performs steps 2 and 3 to the challenge, just as Alice did, to get what again should be H(Y,X).
8. If the results of 6 and 7 are the same:
   Bob knows that Alice is the person who performed step 4 as only she has private key S. Bob cannot use Enc(S, H(Y,X)) as a signature because it contains Alice's spoiler Y.

In the described embodiments, a user (in these embodiments Alice) can sign an authentication request without taking the risk that the user is signing a valid message or a digest of a valid message. Therefore, the same public key cryptography key pair can be used for authentication as well as for signing messages or documents.

The steps described above carried out by the users would in practice be implemented by the user's software.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Modifications and improvements can be made to the foregoing without departing from the scope of the present invention.

The invention claimed is:

1. A method for authentication of a user by an authenticating entity comprising the steps of:
   the authenticating entity sending a challenge to the user;
   the user adding a spoiler to the challenge;
   the user encrypting the combined spoiler and challenge using a private key of an asymmetric key pair; and
   the user sending a response to the authenticating entity in the form of the encrypted combined spoiler and challenge,
   wherein the user sends details of the algorithm used for encryption to the authenticating entity.

2. A method as claimed in claim 1, wherein the method includes the authenticating entity decrypting the encrypted combined spoiler and challenge using the public key of the asymmetric key pair and determining if the user has been authenticated.

3. A method as claimed in claim 1, wherein the addition of a spoiler to the challenge is carried out by applying a spoiler function to the challenge.

4. A method as claimed in claim 3, wherein the form of the spoiler function is sent to the authenticating entity.

5. A method as claimed in claim 1, wherein the spoiler is added to the challenge as a prefix or a suffix and the authenticating entity extracts the challenge by counting the number of bytes from the beginning or end of the combined spoiler and challenge.

6. A method as claimed in claim 1, wherein the method includes the user obtaining a digest of the combined spoiler and challenge before the step of encrypting.

7. A method as claimed in claim 6, wherein the user obtains the digest by applying a hash function to the combined spoiler and challenge.

8. A method as claimed in claim 6, wherein the user sends details of the spoiler and the method of obtaining the digest to the authenticating entity.

9. A method as claimed in claim 8, wherein the authenticating entity obtains a digest of the combined spoiler and the original challenge that the authenticating entity sent to the user and compares the digest to a digest obtained by decrypting the response from the user.

10. A method as claimed in claim 1, wherein the challenge is a bit sequence.

11. A method as claimed in claim 1, wherein the spoiler is an additional bit sequence.

* * * * *